United States Patent
Kirkpatrick et al.

(10) Patent No.: US 7,877,434 B2
(45) Date of Patent: *Jan. 25, 2011

(54) METHOD, SYSTEM AND APPARATUS FOR PRESENTING FORMS AND PUBLISHING FORM DATA

(75) Inventors: Mark A. Kirkpatrick, Conyers, GA (US); Wendy Jennings, Roswell, GA (US); Mauricio Lopez, Atlanta, GA (US)

(73) Assignee: AT&T Intellectual I, L.P., Reno, NV (US)

( * ) Notice: Subject to any disclaimer, the term of this patent is extended or adjusted under 35 U.S.C. 154(b) by 5 days.

This patent is subject to a terminal disclaimer.

(21) Appl. No.: 12/261,884

(22) Filed: Oct. 30, 2008

(65) Prior Publication Data

US 2009/0063661 A1 Mar. 5, 2009

Related U.S. Application Data

(63) Continuation of application No. 09/993,787, filed on Nov. 14, 2001, now Pat. No. 7,469,270.

(51) Int. Cl.
*G06F 15/16* (2006.01)
(52) U.S. Cl. .................. 709/200; 707/736; 707/791
(58) Field of Classification Search ......... 709/200–207, 709/230–239; 715/221–226; 707/2–4, 100–103, 707/736, 756, 791
See application file for complete search history.

(56) References Cited

U.S. PATENT DOCUMENTS

| 6,826,750 | B1 * | 11/2004 | Curtis et al. ............... 717/170 |
| 7,000,236 | B2 * | 2/2006 | Kirkpatrick et al. ......... 719/316 |
| 7,296,297 | B2 * | 11/2007 | Kirkpatrick et al. .......... 726/30 |
| 2003/0131320 | A1 * | 7/2003 | Kumhyr et al. ............. 715/536 |
| 2005/0015717 | A1 * | 1/2005 | Kirkpatrick et al. ......... 715/513 |
| 2006/0085461 | A1 * | 4/2006 | Kirkpatrick et al. ......... 707/100 |

* cited by examiner

*Primary Examiner*—Moustafa M Meky
(74) *Attorney, Agent, or Firm*—Jackson Walker L.L.P.

(57) ABSTRACT

A method for presenting forms and publishing form data are provided. A software component determines if a request for a network resource containing a form has been received. The software component then determines whether a previously compiled class file should be utilized to respond to the form request. If a previously compiled class file cannot be utilized, the software component compiles a class file capable of generating the fields of the requested form. When the class file is compiled, a field engine table is consulted and field names for the fields to be placed on the requested form are retrieved. A field name specified in the field engine table is associated with the correspondence fields in a form. When a submission containing response data for the fields in the form is received, the software component saves the response data in an output table having fields named identically to the fields in the form.

8 Claims, 7 Drawing Sheets

METHOD, SYSTEM AND APPARATUS FOR PRESENTING FORMS AND PUBLISHING FORM DATA

FIELD OF THE INVENTION

The present invention relates to the field of computer forms. More particularly, but not by way of limitation, the present invention relates to the field of dynamically generating forms and publishing form data to a database.

BACKGROUND OF THE INVENTION

In order to effectively market products and services to consumers both on and off the World Wide Web (the "Web" or "WWW"), it is necessary to collect accurate and relevant information from Web users. One way that Web sites have traditionally collected such information is through the use of Web forms. Web forms are markup language documents containing input fields that a user may fill in with data. For instance, a Web form may include text input boxes in which a user may type text data, radio buttons or check boxes that a user may select to identify a particular item, or drop-down menus that provide a list of items that a user may select from. Once the user has made their entries on the Web form, the user may submit the data contained in the completed fields to a host computer for storage and processing. Web forms provide a convenient interface for computer users to provide all kinds of data and are therefore utilized frequently by Web programmers.

Although Web forms are often easy to use from a user perspective, Web forms can be difficult for Web programmers to deploy and maintain. In particular, it is often difficult and time consuming to deploy a new Web form or to add additional fields to an existing Web form. This is generally the result of the software architecture utilized in prior art systems for implementing Web forms. In these systems, the field names utilized to identify the fields within a Web form are 'hard-coded' into the application that handles the forms. Similarly, the names of the database tables and database fields for storing form data are also hard-wired into the application. Because the form field names and database field names are hard-coded into the application, the application code must be modified each time a new form is added or an existing form is modified. This process can be time consuming for an experienced Web programmer and virtually impossible for a non-programmer Web designer.

Therefore, in light of the above, there is a need for a method, system, and apparatus for presenting forms and publishing form data that does not require application code to be rewritten or modified in order to add fields to an existing form. There is a further need for a method, system, and apparatus for presenting forms and publishing form data that does not require application code to be written in order to add a new form to an existing Web application.

SUMMARY OF THE INVENTION

The present invention solves the above-described problems by providing a method, computer system, and computer-readable medium for presenting forms and publishing form data that does not require application code to be rewritten or modified to add fields to an existing form. The present invention also provides a method, system, and apparatus for presenting forms and publishing form data that does not require application code to be written to add a new form to an existing Web application.

Generally described, the present invention comprises a computer system for presenting forms and publishing form data. In one embodiment of the present invention, the computer system maintains a field engine table that contains data describing the fields to be utilized on a form. This data may include data identifying the form name with which the field is to be utilized, the version number of the form with which the field is utilized, the type of input field to be utilized, and other types of data.

The field engine table also contains field names for each of the fields. The field names are associated with the corresponding response data when a user submits the completed form. The computer system also maintains an output table for storing form response data. The output table has the same name as the corresponding form and has fields that have names identical to the form fields contained in the form.

The computer system provided herein also comprises a software component for receiving and responding to requests for network resources, such as Web pages, that contain forms. According to one embodiment of the present invention, the software component is operative to determine if a request for a network resource containing a form has been received. If such a request has been received, the software component determines whether a previously compiled class file should be utilized to respond to the form request. If a previously compiled class file cannot be utilized, the software component compiles a class file capable of generating the fields of the requested form.

When the class file is compiled, the field engine table is consulted and the field names of the fields to be placed on the requested form are retrieved. The field names specified in the field engine table are then associated with corresponding fields in the form. In this manner, the markup language for displaying the form is constructed so the field names will be returned with the corresponding form response data when the completed form is submitted to the software component.

The software component provided herein can also receive the submission of response data associated with each of the field names. This occurs in response to the submission of the completed form by a user. When the software component receives the response data, the software component saves the response data in the output table having the same name as the completed form. The software component also saves the response data for each field in the field of the output table having the same name as the field name of the field. Because the field names of the form fields are the same as the names of the data fields in the output database, the software component does not have to be hard-coded with the field names. Therefore, the software component also does not have to be modified if a form is added to an application or if a field on an existing form is modified.

The present invention also provides an apparatus and computer-readable medium for presenting forms and publishing form data. Additional details regarding the present invention will be provided in the detailed description that follows.

DETAILED DESCRIPTION OF THE PREFERRED EMBODIMENT

The present invention is directed to a method, computer system, and computer-readable medium for presenting forms and publishing form data. Aspects of the present invention may be embodied in an executable software component for providing the functionality described herein. Additionally, aspects of the present invention may be embodied in software components utilized in conjunction with a Web server application program, such as the IPLANET WEB SERVER, provided by IPLANET E-COMMERCE SOLUTIONS—A SUN|NETSCAPE ALLIANCE, of Palo Alto, Calif.

Referring now to the figures, in which like numerals represent like elements, an actual embodiment of the present invention will be described. Although aspects of the invention will be described in the general context of an application program that executes on an operating system in conjunction with a server computer, those skilled in the art will recognize that the invention also may be implemented in combination with other program modules. Generally, program modules include routines, programs, components, data structures, and the like, that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. Although the invention is also described as being practiced in distributed computing environment, where tasks are performed by remote processing devices that are linked through a communications network, other possible implementations should be apparent to those skilled in the art.

Figure 1:
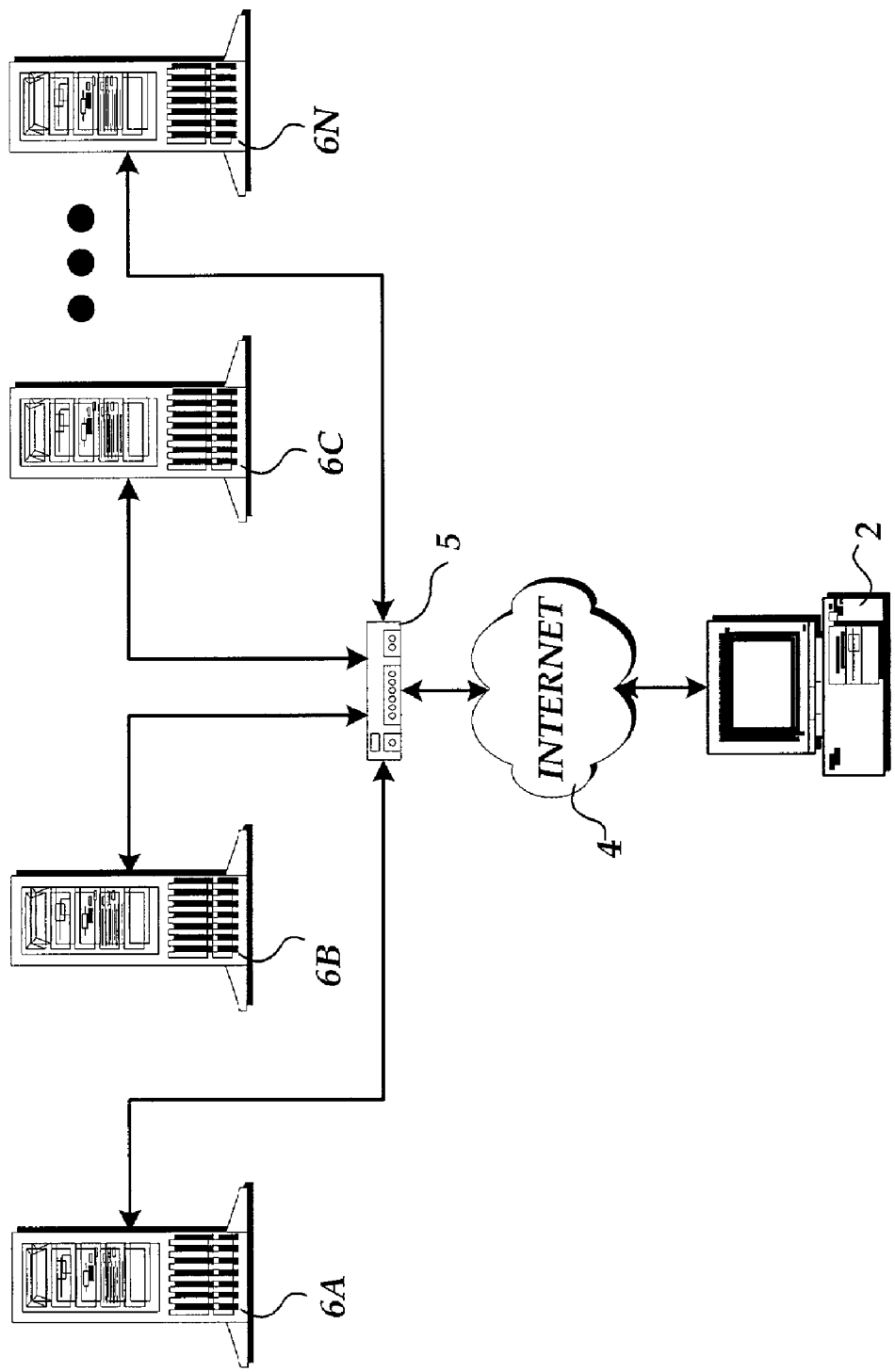
FIG. 1 is a network architecture diagram showing an illustrative operating environment for an actual embodiment of the present invention.

Referring now to FIG. 1, an illustrative operating environment for an embodiment of the present invention will be described. Aspects of the present invention are implemented as an executable software component executing on a server computer, such as Web server computers 6A-6N, accessible via a distributed computing network, such as the Internet 4. As is well known to those skilled in the art, the Internet 4 comprises a collection of networks and routers that use the Transmission Control Protocol/Internet Protocol ("TCP/IP") to communicate with one another. The Internet 4 typically includes a plurality of local area networks ("LANs") and wide area networks ("WANs") that are interconnected by routers. Routers are special purpose computers used to interface one LAN or WAN to another. Communication links within the LANs may be twisted wire pair, or coaxial cable, while communication links between networks may utilize 56 Kbps analog telephone lines, 1 Mbps digital T-1 lines, 45 Mbps T-3 lines or other communications links known to those skilled in the art. Furthermore, computers, such as client computer 2 and other related electronic devices, can be remotely connected to either the LANs or the WANs via a permanent network connection or via a modem and temporary telephone link. It will be appreciated that the Internet 4 comprises a vast number of such interconnected networks, computers, and routers.

A client computer 2 capable of executing a Web browser application program (not shown), such as Microsoft® Internet Explorer, may be utilized to transmit a request for a Web page or other type of network resource to one of the Web server computers 6A-6N. As is well known to those skilled in the art, the Web is a vast collection of interconnected network resources, including "hypertext" documents written in Hypertext Markup Language ("HTML"), or other markup languages, that are available from "Web sites" accessible through the Internet 4. A Web site is provided by a Web server computer, like Web server computers 6A-6N, connected to the Internet 4, that has mass storage facilities for storing such network resources, and that executes administrative software for handling requests for the network resources.

Large-scale Web sites are typically implemented utilizing a two-tier computer systems architecture as shown in FIG. 1. The first tier typically comprises one or more "front-end" Web server computers, like Web server computers 6A-6N, that receive and process live requests for network resources from client computers 2 connected to the Internet 4. As is well known to those skilled in the art, the first tier Web servers are frequently connected to the Internet 4 through a load balancing device 5, such as the Local Director™ from Cisco Systems®. The load balancing device 5 intercepts requests intended for one of the Web server computers 6A-6N, and forwards each request to a Web server computer that has computing resources available to respond to the request. In addition to the Web server computers 6A-6N, a large-scale Web site may also include a "back-end" server computer (not shown) that stores network resources that may be served to client computer 2 by one of the Web server computers 6A-6N. Additional details regarding the operation of the Web server computers 6A-6N will be provided below with respect to FIGS. 2-8.

Figure 2:
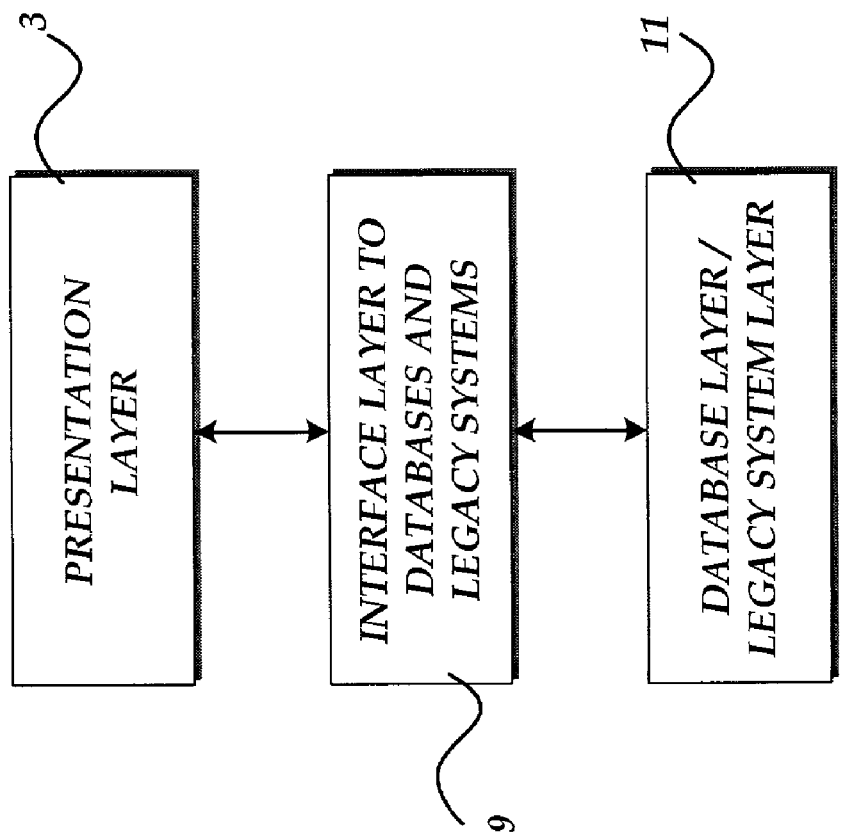
FIG. 2 is a software architecture diagram showing a three-tier software architecture utilized in an actual embodiment of the present invention.

Turning now to FIG. 2, an illustrative software architecture for operating a Web server computer 6A will be described. As shown in FIG. 2, a three-tier software architecture is utilized. The three-tier architecture separates the data and logic for generating data from the presentation of the data. By separating data and logic in this manner, the presentation of the data may be easily modified without modification of the underlying business logic.

The three-tier software architecture shown in FIG. 2 includes a presentation layer 3. The function of the presentation layer is to provided the presentation of data to a requesting device. According to the actual embodiment of the present invention described herein, the presentation layer comprises JAVA SERVER PAGE ("JSP") technology provided by SUN MICROSYSTEMS. As is known to those skilled in the art, JSP pages provide a simplified way to create Web pages that display dynamically-generated content. Additional details regarding the JSP technology utilized in the actual embodiment described herein will be discussed in greater detail below with respect to FIG. 3. Those skilled in the art should appreciate that other types of presentation layer technologies, such as the ACTIVE SERVER PAGE technology from MICROSOFT CORPORATION, may also be utilized to implements aspects of the present invention.

The second tier of the three-tier software architecture shown in FIG. 2 comprises an interface layer 9 to databases and legacy systems. The interface layer 9 comprises executable software code for providing an interface to business logic, databases, and other types of legacy systems. In the actual embodiment of the present invention described, this layer comprises JAVA BEANS or ENTERPRISE JAVA BEANS for interfacing with the database layer 11, but other types of code platforms may be utilized. The database layer 11 comprises an interface to databases and other types of legacy computer systems. Other types of executables may also be utilized. Additional details regarding the software architecture for the Web server computer 6A will be described below with reference to FIG. 3.

Figure 3:
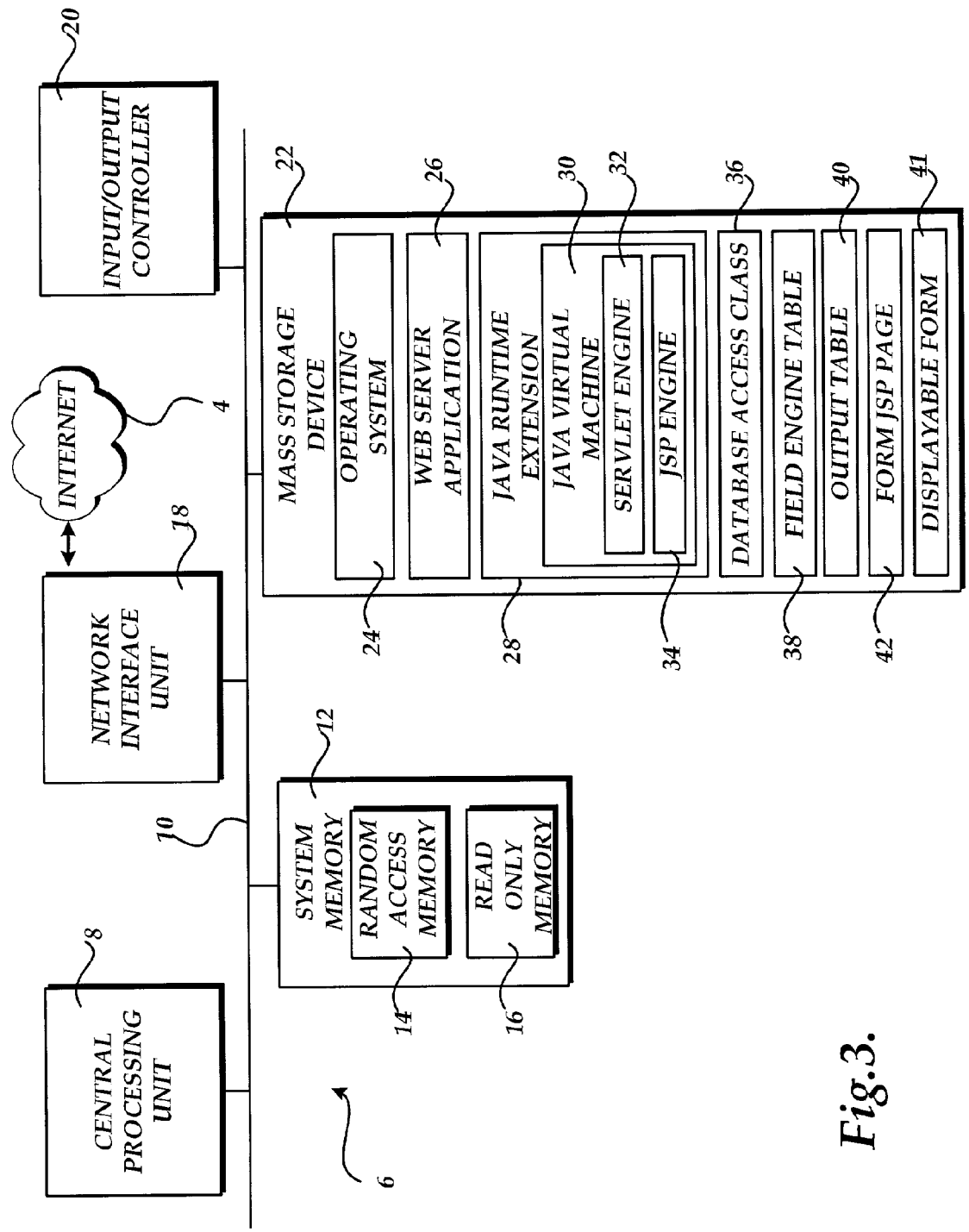
FIG. 3 is a block diagram showing an illustrative hardware architecture for a Web server computer utilized in an actual embodiment of the present invention.

Referring now to FIG. 3, a hardware architecture for an illustrative Web server computer 6A will be described. The Web server computer 6A comprises a general purpose server computer for receiving and responding to Hypertext Transfer Protocol ("HTTP") requests as known to those skilled in the art. The Web server computer 6A comprises a conventional server computer, including a central processing unit 8, a system memory 12, and a system bus 10 that couples the system memory 12 to the processing unit 8. The Web server computer 6A also typically includes at least some form of computer-readable media.

Computer-readable media can be any available media that can be accessed by the Web server computer 6A. By way of example, and not limitation, computer-readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, random access memory ("RAM"), read only memory ("ROM"), EPROM, EEPROM, flash memory or other solid-state memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by the Web server computer 6A.

According to an embodiment of the present invention, the system memory 12 includes a ROM 16 and a RAM 14. A basic input/output system ("BIOS") (not shown), containing the basic routines that help to transfer information between elements within the Web server computer 6A, such as during start-up, is stored in the ROM 16. The Web server computer 6A further includes a mass storage device 22, such as a hard disk drive, a magnetic disk drive, e.g., to read from or write to a removable disk, or an optical disk drive, e.g., for reading a CD-ROM disk or to read from or write to other optical media such as a DVD. The Web server computer 6A may include a combination of such mass storage devices. The mass storage device 22 is connected to the system bus 10 through a mass storage device interface (not shown).

As described above with respect to FIG. 1, the Web server computer 6A operates in a networked environment. According to an embodiment of the invention, the Web server computer 6A communicates with the client computer 2 over the Internet 4. The Web server computer 6A connects to the Internet 4 through a network interface unit 18. It should be appreciated that the network connections shown are illustrative and other means of establishing a communications link between the Web server computer 6A and the Internet 4 may be utilized.

A user may control the operation of the Web server computer 6A through traditional input devices such as a keyboard or a mouse. These and other input devices may be connected to the central processing unit 8 through an input/output controller 20 that is coupled to the system bus 10. A monitor (not shown) or other type of display device may also be connected to the system bus 10 via a video display interface (not shown). Additionally, the Web server computer 6A may include other peripheral output devices, such as a printer.

A number of program modules may be stored in the mass storage device 22 and RAM 14, including an operating system 24 suitable for controlling the operation of a server computer, such as the SOLARIS operating system from SUN MICROSYSTEMS of Palo Alto, Calif. Additionally, a Web server application program 26 may be stored in the mass storage device 22 and the RAM 30, such as the IPLANET WEB SERVER, provided by IPLANET E-COMMERCE SOLUTIONS—A SUN|NETSCAPE ALLIANCE, of Palo Alto, Calif. As known to those skilled in the art, the Web server application program 26 is operative to receive HTTP requests through the network interface 18 and to respond to those requests. Typically, an HTTP request will take the form of a request for a network resource such as a JSP page, a page encoded in HTML, a graphics file, or another application program stored at, or accessible to, the Web server computer 6A.

In conjunction with the Web server application 26, the Web server computer 6A may also maintain a JAVA runtime extension package 28 that supports the use of JAVA servlets and JSP pages on the Web server computer 6A. The JAVA runtime extension package 28 comprises a JAVA virtual machine 30 which includes a servlet engine 32 and a JSP engine 34. As known to those skilled in the art, JAVA servlets are programs written in the JAVA programming language from SUN MICROSYSTEMS that execute on a server computer as opposed to a client computer. The JAVA virtual machine 30 interprets JAVA programs that have been compiled into byte-code and stored in a class file.

JSP pages provide a simplified way to create Web pages that display dynamically-generated content. JSP pages utilize extensible markup language ("XML") tags and scriptlets written in JAVA to encapsulate the logic that generates the content for the page. JSP passes any formatting tags directly back to the response page. In this way, JSP pages separate the page logic from the design and display of the page. More specifically, JSP pages are created to include JSP technology-specific tags, declarations, and possibly scriptlets, in combination with other static (HTML or XML) tags. The JSP engine 34 interprets the tags and scriptlets contained in a JSP page and generates a class file which, when interpreted by the servlet engine 32, generates and returns the desired content. A JSP page may include calls to external components, such as the database access class 36, JAVABEANS components, the JAVA Database Connectivity ("JDBC") application programming interface, or other types of components. A JSP page may also include a file. A JSP page has the extension ".jsp," which signals to the Web server application 26 that the JSP engine 34 will process elements on the page. Additional details regarding the operation of the database access class will be described below with reference to FIGS. 5-7.

The Web server computer 6A also maintains a form JSP page 42 on the mass storage device 22. Using the above-described process for executing JSP, the form JSP page 42 generates the content for a Web page that includes a form. As mentioned above, a form comprises a page that contains input fields that a user may fill in with data. As will be described in greater detail below with respect to FIGS. 5-7, the form JSP page 42 utilizes the database access class 36, which in turn utilizes the field engine table 38, to generate the content for displaying the form. The form JSP page 42 also utilizes the database access class 36 to save the posted form data to the output table 40. Additional details regarding the format and structure of the field engine table 38 and the output table 40 are described below with reference to FIG. 4. Additional details regarding the operation of the database access class 36 will be provided below with respect to FIGS. 5-7.

Figure 4:
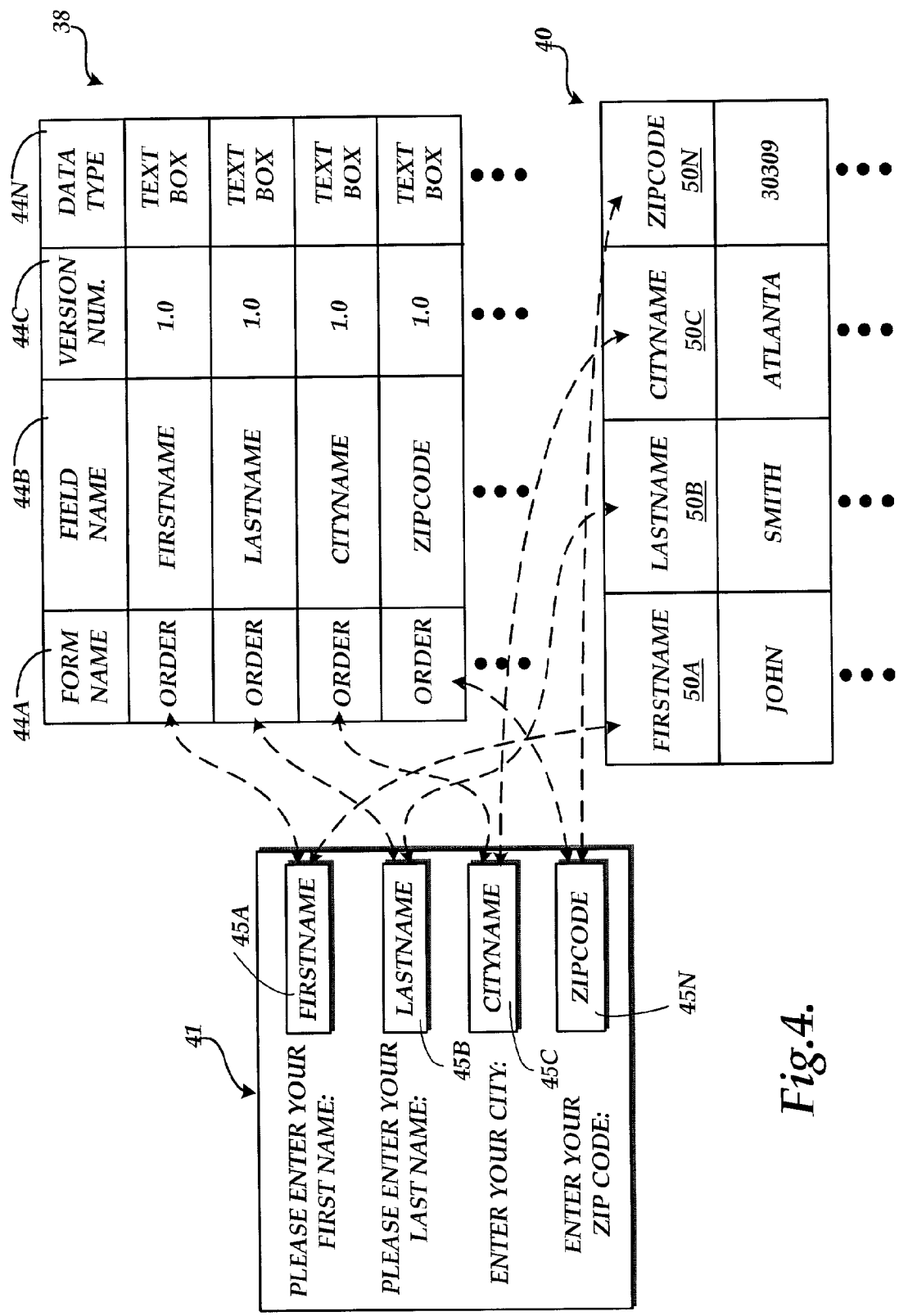
FIG. 4 is a block diagram showing the format and contents of an illustrative field engine table utilized in an actual embodiment of the present invention.

Turning now to FIG. 4, the format and contents of the field engine table 38 and the output table 40 will be described. As discussed briefly above, the field engine table 38 is utilized by the database access class 36 to generate the markup language for displaying a form. The database access class 36 is called from the form JSP page 42. In particular, the field engine table 38 defines the field names for each of the fields in a form and the data type for each field. To accomplish this, the field engine table 38 contains a form name field 44A, a field name field 44B, a version number field 44C, and a data type field 44N.

The form name field 44A identifies a particular Web form associated with a particular field. The field name field 44B specifies the name that should be utilized to identify the field and the response data submitted for the field. The data type field 44N comprises data indicating what type of input field should be displayed. For instance, the data type field 44N may indicate that a text field for entering numbers, words, or other small pieces of text, a text area field for free-form, multi-line text entries, a radio button for picking one item in a list, or other type of input field should be displayed. The version number field 44C identifies a version number corresponding to the field. Through the use of these fields, the database access class 36 may create markup language comprising a displayable form 41 that has fields 45A-45N having field names as specified by the field name field 44B.

As shown in FIG. 4, the output table 40 has data fields 50A-50N that are named identically to the fields of the displayable form 41. For instance, the output table 40 shown in FIG. 4 has data fields named "FIRSTNAME," "LASTNAME," "CITYNAME," and "ZIPCODE." The output table 40 also has a name that is identical to the name of the displayable form 41. In the example shown in FIG. 4, the name of the form is "ORDER" and the name of the output table 40 is "ORDER." By creating the output table 40 in such a manner that its data field names are identical to the fields of the form, the database access class 36 does not need to be hard-coded with the field names. Additional details regarding the use and operation of the field engine table 38 and the output table 40 will be described below with respect to FIGS. 5-7.

Figure 5:
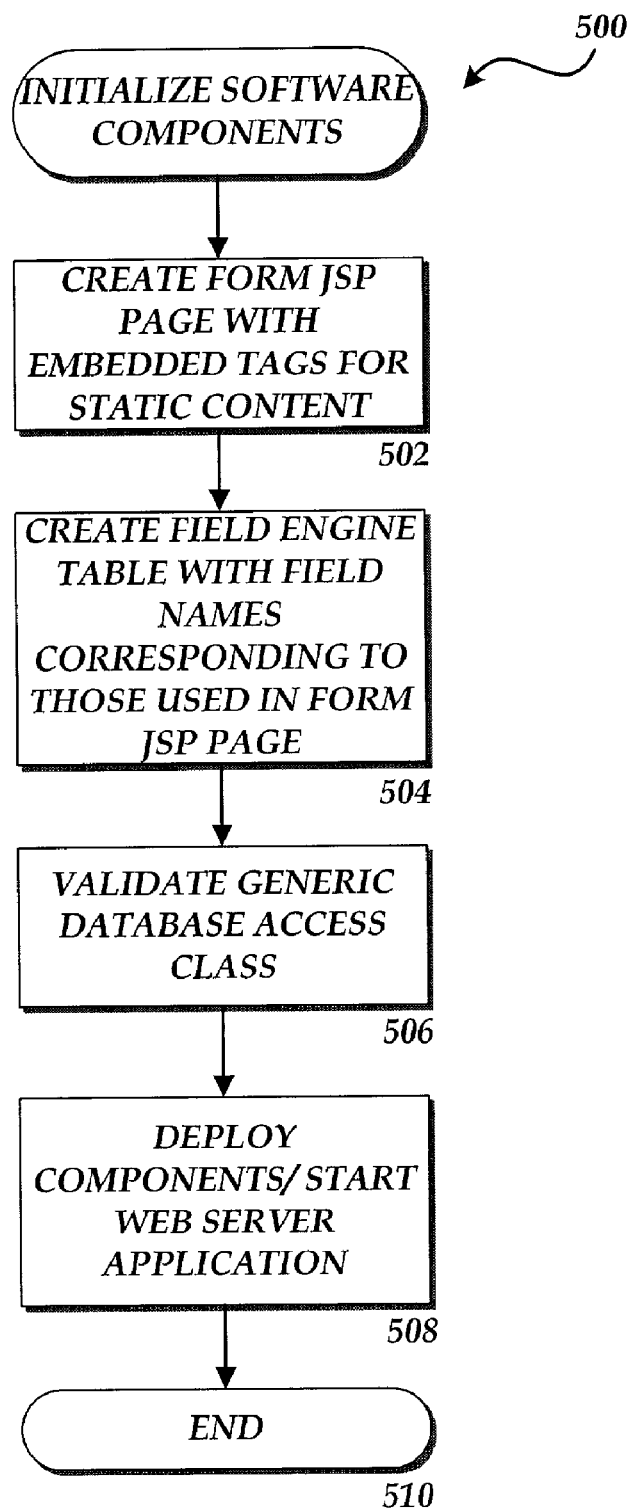
FIG. 5 is a flow diagram showing an illustrative routine for initializing software components utilized in an actual embodiment of the present invention.

Referring now to FIG. 5, an illustrative routine 500 will be described for initializing software components utilized to generate a displayable form 41 from the contents of the field engine table 38. The routine 500 begins at block 502 where the form JSP page 42 is created. As described briefly above, the form JSP page 42 includes embedded tags for formatting and displaying the Web page content. The form JSP page 42 also includes calls to the database access class 36 for generating the form fields contained on the page.

From block 502, the routine 500 continues to block 504, where the field engine table 38 is created. The field engine table 38 defines the fields that should be utilized in the form. As described above with respect to FIG. 4, the field engine table 38 includes field names, a form name, a version number, and a data type for each field contained in the form JSP page 42. From block 504, the routine 500 continues to block 506, where the generic database access class 36 is validated. The routine 500 then continues to block 508, where the database access class 36, the field engine table 38, and the form JSP page 42 are deployed on the Web server computer 6A. The Web server application 26 is then initialized. Once the Web server application 26 has been initialized, it is operative to receive and process requests for the form JSP page 42. This includes requests to generate the displayable form 41 or to publish data in a completed form. The operation of the Web server application 26 in this regard is described in detail below with respect to FIGS. 6 and 7. From block 508, the routine 500 continues to block 510, where it ends.

Figure 6:
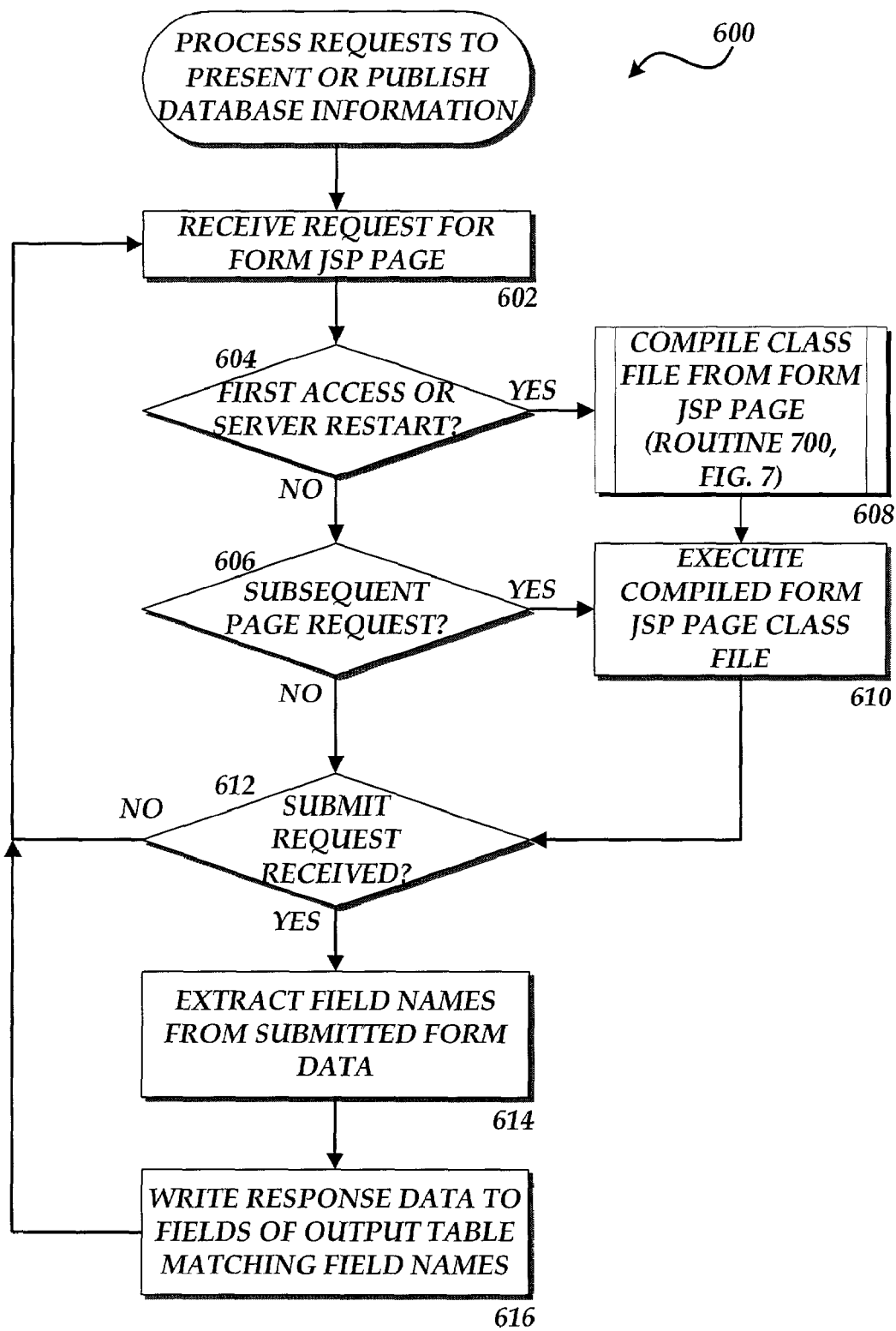
FIG. 6 is a flow diagram showing an illustrative routine for processing requests to present of publish database information according to one actual embodiment of the present invention.

Referring now to FIG. 6, an illustrative routine 600 will be described for processing requests to present the form JSP page 42 or to publish the completed fields of the form. The routine 600 begins at block 602, where a request is received by the Web server application 26 for the form JSP page 42. As described above, the file extension of the form JSP page 42 will indicate to the Web server application 26 that the response to the request for the file should be handled by the JAVA runtime extension 28.

From block 602, the routine 600 continues to block 604, where the JAVA runtime extension 28 determines whether the current request for the form JSP page 42 is the first request for the page since the last server restart. If the current request is the first request for the form JSP page 42, the routine 600 branches to block 608. If the current request is not the first request, the routine 600 continues to block 606.

At block 608, an executable class file is created from the form JSP page 42 by the JSP engine 34. An illustrative routine for compiling the form JSP page 42 is described below with respect to FIG. 7. From block 608, the routine 600 continues to block 610, where the compiled form JSP page 42 is executed. The execution of the compiled file results in the displayable form 41 being returned to the client computer 2 that initially requested the form JSP page 42. The routine 600 then continues from block 610 to block 612.

At block 606, a determination is made as to whether the current request for the form JSP page 42 is not the first request for the page. If the current request is not the first request, the routine 600 branches from block 606 to block 610 where a previously compiled class file is executed. The previously compiled class file is utilized to respond to the request for the form JSP page 42. If, at block 606, a determination is made that the current request for the form JSP page 42 is not a subsequent request, the routine 600 branches from block 606 to block 612.

At block 612, a determination is made as to whether a request has been received at the Web server application 26 to submit completed fields of the form JSP page 42. Such a request is typically initiated by a user after the user has completed the fields of the form JSP page 42 with response data. If such a request is received, the routine 600 continues from block 612 to block 614, where the field names associated with the response data are extracted from the submission. The routine 600 then continues to block 616, where the response data is written to the fields of the output table 40 matching the field names of the form JSP page 42. In this manner, response data is written to fields of the output table 40 corresponding to the identically named fields. The routine 600 returns from block 616 to block 602, where a subsequent request for the form JSP page 42 is processed.

Figure 7:
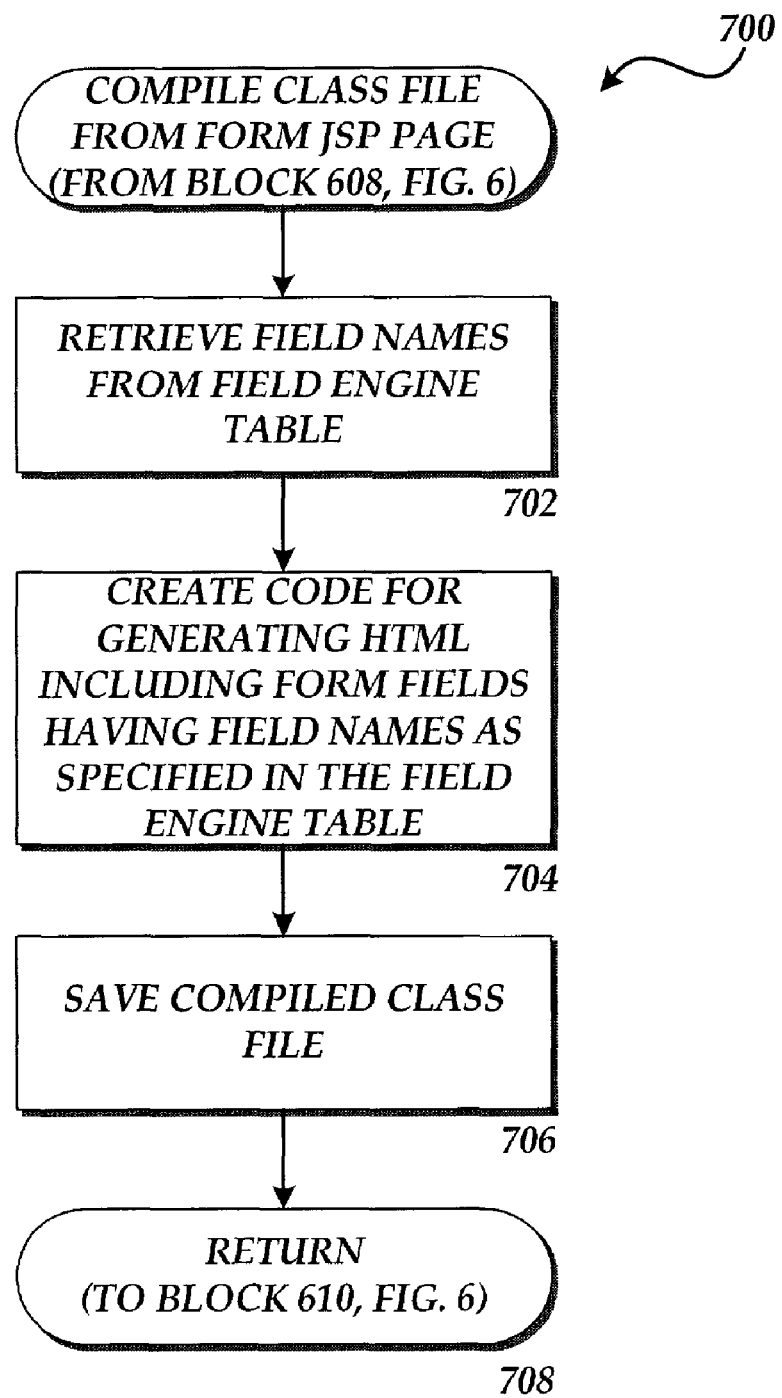
FIG. 7 is a flow diagram showing an illustrative routine for compiling an executable component capable of presenting and publishing database information in an actual embodiment of the present invention.

Turning now to FIG. 7, an illustrative routine 700 will be described for compiling an executable class file from the form JSP page 42. As discussed briefly above, the JSP engine 34 compiles the form JSP page 42 into byte-code that is executable by the servlet engine 32. In particular, the routine 700 begins at block 702, where the field names for the appropriate form are retrieved from the field engine table 38. The routine 700 then continues to block 704, where an executable code is created for generating mark-up language to display the forms, including field names as specified in the field engine table 38.

The routine 700 then continues to block 706, where the compiled class file is saved. The routine 700 then continues to block 708, where it returns to block 610, FIG. 6, and the compiled class file is executed. When the compiled class file is executed, it prepares and returns a response to the client computer 2 for the form JSP page 42.

Those skilled in the art should appreciate that although the present invention is described herein as being implemented using JSP pages, other technologies for dynamically generating content may be utilized to implement the present invention. For instance, Active Server Pages ("ASP") from MICROSOFT CORPORATION of Redmond, Wash., could be utilized to implement the present invention. Those skilled in the art should also appreciate that although the present invention is described in the context of a Web server application, an application server may also be utilized to provide the functionality described herein.

Based upon the foregoing, it should be appreciated that the present invention provides a method, computer system, and computer-readable medium for presenting forms and publishing form response data. Moreover, the above specification, examples and data provide a complete description of the manufacture and use of the composition of the invention. Since many embodiments of the invention can be made without departing from the spirit and scope of the invention, the invention resides in the claims hereinafter appended.

We claim:

1. Computer-readable media, including instructions for presenting forms and publishing form data, the instructions executable to:
   maintain a field engine table, the field engine table comprising a form field identifier for a respective form field, wherein a form field identifier includes:
      a field name for a form field corresponding to the form field identifier, wherein the field name specifies the form field that is to be utilized to identify response data;
      a form name, wherein the form name identifies a particular form associated with the form field; and
      a data type, the data type comprising at least one of the following: a text field, a text area field for multi-line text entries, and a radio button;
   receiving a request for a network resource including a form comprising the form field;
   in response to determining whether a previously compiled class file is to be utilized to respond to the request, executing the previously compiled class file and responding to the request with content generated by the previously compiled class file;
   in response to determining that the previously compiled class file is not to be utilized to respond to the request, creating an executable class file utilizing the field engine table, the executable class file including instructions to retrieve:
      a field name of the form, the form name corresponding to the field name;
      the data type corresponding to the field name; and
      wherein the field name is associated with a corresponding response data of the form and a corresponding data type indicating a type of input field to display for the field name, and wherein the executable class file includes instructions to generate source code for displaying the form field in a web browser;
   generating the source code by executing the class file;
   returning the source code as a response to the request for the network resource; and
   maintaining an output table for storing the response data, further comprising:
      receiving a request to publish the response data associated with the field name of the form; and
      storing the response data associated with the field name of the form in the output table, the output table having output table fields matching field names of the form, wherein storing the response data in the output table comprises writing the response data associated with the form field names to the output table fields with matching names.

2. The computer-readable media of claim 1, wherein determining whether the previously compiled class file is to be utilized further comprises:
   determining whether the request for the network resource was a first request for the network resource.

3. The computer-readable media of claim 1, wherein determining whether the previously compiled class file is to be utilized further comprises:
   determining whether a web server operative to provide the network resource was reset since the last time the network was accessed.

4. The computer-readable media of claim 1, further comprising:
   receiving a submission of response data associated with a plurality of field names; and
   saving the response data associated with the plurality of field names in the output table.

5. The computer-readable media of claim 1, wherein creating the executable class file further comprises:
   selecting a runtime extension based upon a file extension associated with the request.

6. A computer system to for presenting forms and publishing form data, the computer system comprising:
   a processor coupled to computer-readable media, wherein the computer-readable media include processor executable instructions to:
      generate a field engine table including a form field identifier for a form field, wherein a form field identifier includes:
         a field name,
         a form name, wherein the form name identifies a particular form associated with the form field, and wherein the field name specifies the field name that is utilized to identify response data submitted; and
         a data type for the form field;
      access a network resource including a form comprising the form field;
      receive and respond to requests for the network resource, further including processor executable instructions to:
         determine whether a previously compiled class file should be utilized to respond to a request for the network resource;
         in response to determining that the previously compiled class file is to be utilized, execute the previously compiled class file and respond to the request with content generated by the previously compiled class file;
         in response to determining that the previously compiled class file is not to be utilized create an executable class file, utilize a field engine table to retrieve the following:
            a field name of the form, the form name corresponding to the field name; and
            the data type corresponding to the field name;

wherein the field name is associated with a corresponding response data of the form and a corresponding data type indicating a type of input field to display for the field name, wherein the executable class file generates source code for displaying the form field in a web browser, wherein the executable class file is not hard coded with the field name, and wherein a runtime extension is selected to create the executable class file based upon a file extension associated with the request, execute the class file;

respond to the request with the source code generated by the execution of the class file; and maintain an output table for storing the response data, further comprising processor executable instructions to:

receive a request to publish response data associated with the field name; and store the response data associated with the field name of the form in the output table, the output table having output table fields with a name identical to the field name of the form, including processor executable instructions to:

write the response data associated with the field name of the form to the output table field name matching the field name of the form.

7. The computer system of claim 6, wherein the processor executable instructions to determine whether the previously compiled class file is to be utilized further include processor executable instructions to:

determine whether the request for the network resource was a first request for the network resource.

8. The computer system of claim 6, wherein the processor executable instructions to determine whether the previously compiled class file is to be utilized further include processor executable instructions to:

determine whether said processor executable instructions to receive and respond to requests for the network resource were restarted since a previous request for the network resource was received.

* * * * *

UNITED STATES PATENT AND TRADEMARK OFFICE
CERTIFICATE OF CORRECTION

PATENT NO. : 7,877,434 B2  
APPLICATION NO. : 12/261884  
DATED : January 25, 2011  
INVENTOR(S) : Mark A. Kirkpatrick et al.

Page 1 of 1

It is certified that error appears in the above-identified patent and that said Letters Patent is hereby corrected as shown below:

On the Title page, Item (73) should read:

(73) Assignee: AT&T Intellectual Property I, L.P., Reno, NV (US)

Signed and Sealed this
Eighth Day of March, 2011

David J. Kappos
*Director of the United States Patent and Trademark Office*